Jan. 1, 1924

W. R. BROWNE

DENTAL FLOSS HOLDER

Filed Oct. 10, 1921

1,479,364

INVENTOR.
Waldo Ralph Browne:

Patented Jan. 1, 1924.

1,479,364

UNITED STATES PATENT OFFICE.

WALDO RALPH BROWNE, OF WYOMING, NEW YORK.

DENTAL FLOSS HOLDER.

Application filed October 10, 1921. Serial No. 506,822.

*To all whom it may concern:*

Be it known that I, WALDO RALPH BROWNE, a citizen of the United States, residing at Wyoming, in the county of Wyoming and State of New York, have invented a new and useful Improvement in Dental Floss Holders, of which the following is a specification.

This invention relates to a holder for dental floss; and has for its objects to provide a holder whereby dental floss may be held under tension for cleaning teeth in an easy and efficient manner.

It is also an object that the holder be inexpensive to manufacture and adapted to permit the use of dental floss for cleaning teeth in a sanitary manner.

It is a further and important object of the invention to provide a novel form of dental floss adapted to be used in conjunction with the holder.

Other objects will hereinafter appear in the detailed description to follow.

For the construction of the holder there is provided two principal members, each consisting in a handle portion and a finger portion. One of these members is stationary and adapted to serve for retaining a bobbin of floss, and the other member is fulcrumed upon the first named member and so arranged that the finger portions may be employed for tensioning floss.

The invention is illustrated by way of example in the accompanying drawings, in which:—

Figure 3:
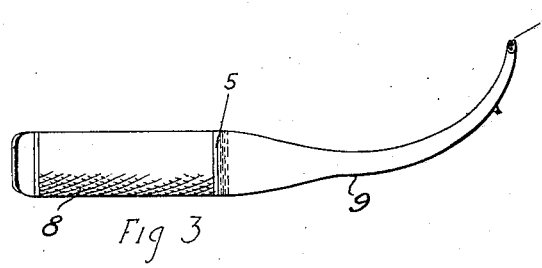
Figure 3 is a view in side elevation of the stationary member.

Referring to the drawings more particularly, as best shown in Figure 3 the stationary holder member consists in a hollow or tubular handle portion 8 which is threaded as at 5 to the hollow finger portion 9. The finger portion tapers toward its free end and is preferably curved as shown. The finger portion 9 terminates in a flattened portion 10 which is formed with a slot 1. The outlet of this end of finger portion 9 is adjacent the flattened portion 10. Also, adjacent the free end of finger portion is formed a cutter 2.

Figure 1:
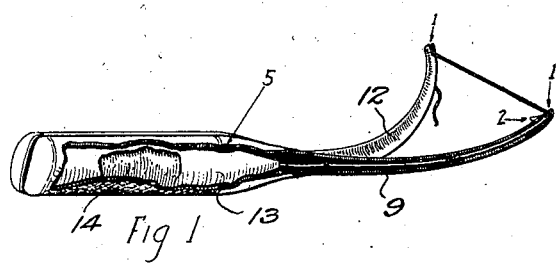
Figure 1 is a perspective view of the holder with parts broken away and shown in section to more clearly illustrate the invention.
Figure 2:
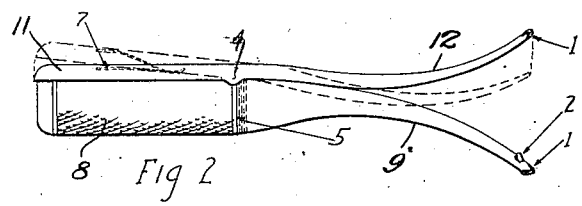
Figure 2 is a top view of the same and showing the fulcrumed member in its extended and normal positions in full and dotted lines respectively.

The fulcrumed holder member consists in a handle portion 11 and a curved finger portion 12. The two portions are preferably integral, concave in cross section, and adapted to fit upon the stationary holder member as shown in Figures 1 and 2. The fulcrumed member is pivotally connected to the stationary member as at 4. The finger portion 12 of fulcrumed member diverges from the similar portion of other holder member; and between the handle portions of these members there is interposed a spring as at 7 whereby to normally hold the fulcrumed holder members in dotted line position shown in Figure 2. The finger portion 12 of fulcrumed member also has its end slotted as at 1'.

Figure 5:
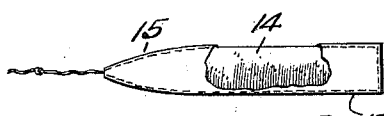
Figure 5 is a view in side elevation of floss cartridge or magazine.
Figure 6:
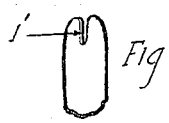
Figures 6 and 7 are detail views of the ends of fulcrumed and stationary holder members respectively.
Figure 7:
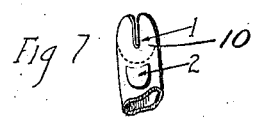

The floss cartridge shown in Figure 5 is in the form of a shell 13 having its one end open for inserting a bobbin of floss 14, and its other end tapered as at 15, and this end provided with an opening through which a strand of floss may be fed.

Figure 4:
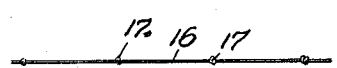
Figure 4 is a segment of dental floss made in accordance with the invention.

In Figure 4 the preferable form of floss to be used in conjunction with the present device is shown in which 16 indicates the strand, said strand being formed preferably at equal intervals with knots 17.

In using the present invention the filled cartridge is inserted within the tubular handle portion 8 of the stationary holder member in an obvious manner, and the strand of floss is extended from free end of finger portion 9 and through the slot 1. Any time it is desired to use the device for cleaning teeth, the free and extended end of floss is pulled further so that it may be placed in slot 1' of fulcrumed member of holder. Now by pressing together the handle portions of the holder members the floss is tensioned because the knots in floss will not pass through slots 1 and 1'. The floss may now be forced between teeth for cleaning the same, and when the operator has finished he may release the fulcrumed member of holder and release tension upon floss. The floss may now be disengaged from finger 12 and the cutter 2 employed to sever the same close to the finger 9.

While I have shown and described the preferred form of my invention, I wish it to be understood that I am aware of the fact that the construction, combination and arrangement of parts may be changed by those skilled in the art without departing from the spirit of the invention as indicated by the appended claims.

I claim:—

1. A device of the character described, comprising a tubular member adapted to serve as a receptacle for dental floss, said tubular member terminating at one end in a curved hollow extension finger, a second member having a similarly curved finger extending from its one end and adapted to fit upon the tubular member, means for fulcruming the tubular member upon the first named member whereby the fingers of said members are disposed in divergent relation, yieldable means interposed between the tubular member and second named member adapted to urge the fingers toward each other, and means whereby the dental floss within the tubular member may be extended and secured between the fingers when in the last named position and thereby permitting the dental floss to be tensioned when said members are operated to move the fingers away from each other.

2. A device of the character described, comprising a tubular member terminating at its one end in a curved hollow extension finger, a semi-circular member terminating at its one end in a curved extension finger and of substantially the same length as the first named member, means for fulcruming the second member upon the first named member, said second member being adapted to fit upon the first named member, the fingers of said members extending in diverging relation, and the first named member having an opening in the free end of its finger adapted to permit the passage of thread or the like and the finger of the other member being bifurcated to receive a thread.

3. A device of the character described, comprising a tubular handle adapted to serve as a receptacle for dental floss, a curved finger threaded upon the one end of said handle, said finger being likewise tubular handle and terminating at its free end through a restricted opening through which said dental floss may be extended, a second handle member fulcrumed intermediate its ends upon the tubular handle, said second member having its similar end formed with a curved finger and said fingers extending in divergent relation with respect to each other, means for yieldably urging the fingers away from each other, and means whereby the dental floss may be extended and secured between said fingers when in their last named position and thereby permit the floss to be tensioned when said handles are operated to move the fingers away from each other.

4. In a device of the character described, a tubular handle, a curved finger threaded upon the one end of the handle, said finger being likewise tubular and terminating at its free end in a restricted opening, a second handle fulcrumed intermediate its ends upon the first named handles, the second handle being semi-circular in cross section and having its forward end formed with a curved finger, the free end of which is bifurcated, said fingers extending in divergent relation with the first named finger, and a cartridge within the tubular handle adapted to receive a bobbin thread and having a tapering forward end with a restricted opening through which the thread may be extended.

In testimony whereof I have signed my name to this specification in the presence of two subscribing witnesses.

WALDO RALPH BROWNE.

Witnesses:
C. A. GRAHAM,
W. G. JAMESON.